United States Patent

[11] 3,618,875

| [72] | Inventor | Peter G. Kappus |
| | | Cincinnati, Ohio |
| [21] | Appl. No. | 801,293 |
| [22] | Filed | Feb. 24, 1969 |
| [45] | Patented | Nov. 9, 1971 |
| [73] | Assignee | General Electric Company |

[54] V/STOL AIRCRAFT
14 Claims, 8 Drawing Figs.

[52] U.S. Cl. .................................................. 244/12 B, 244/23 B
[51] Int. Cl. ................................................... B61c 29/04
[50] Field of Search ....................................... 244/12, 15, 23

[56] References Cited
UNITED STATES PATENTS

| 2,973,166 | 2/1961 | Stahmer | 244/23 |
| 3,161,374 | 12/1964 | Allred et al. | 244/12 |
| 3,289,975 | 12/1966 | Hall | 244/55 |
| 3,131,873 | 5/1964 | Sanders | 244/12 |
| 3,267,667 | 8/1966 | Erwin | 244/23 |

Primary Examiner—Milton Buchler
Assistant Examiner—Steven W. Weinrieb
Attorneys—Derek P. Lawrence, E. S. Lee, III, Lee H. Sachs, Frank L. Neuhauser and Oscar B. Waddell ABSTRACT: A V/STOL aircraft comprises a fuselage having tandem wings which are offset lengthwise and vertically. Identical propulsion units are provided in each wing half. Each power unit comprises a pair of gas generators mounted respectively above and below the wing half and a pair of lift fans mounted within the wing structure on opposite sides of the engines. A valve system diverts the hot gas stream of the engines into a plenum chamber formed integrally with the wing structure. The hot gas streams are then directed from the plenum chamber to a tip turbine which powers the lift fans when vertical thrust is desired in operation of the aircraft. When forward speed of the aircraft is great enough for the aircraft wings to have sufficient lift, the hot gas streams are directed through propulsive nozzles providing a forward thrust component. In cruise, one engine of each power unit could be shut down. Each engine and each lift fan has emergency capacity which is automatically brought into play in the event of a failure of a lift fan or engine, with proper adjustments being made to the other power units to maintain balance and controlled operation of the aircraft in the lift mode.

PATENTED NOV 9 1971 3,618,875

INVENTOR.
PETER G. KAPPUS

ATTORNEY

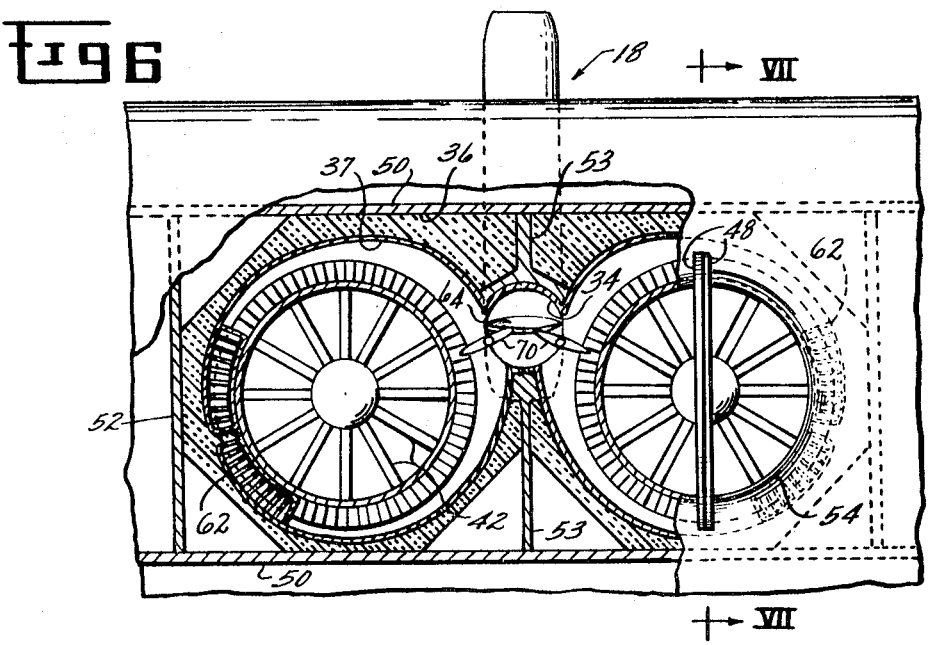
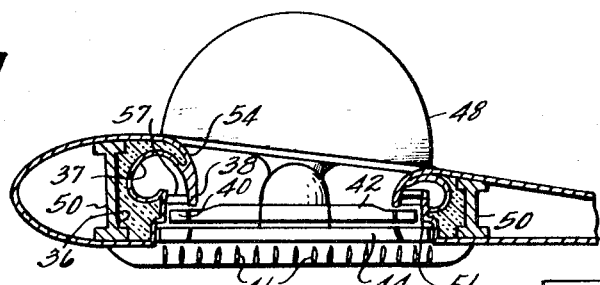
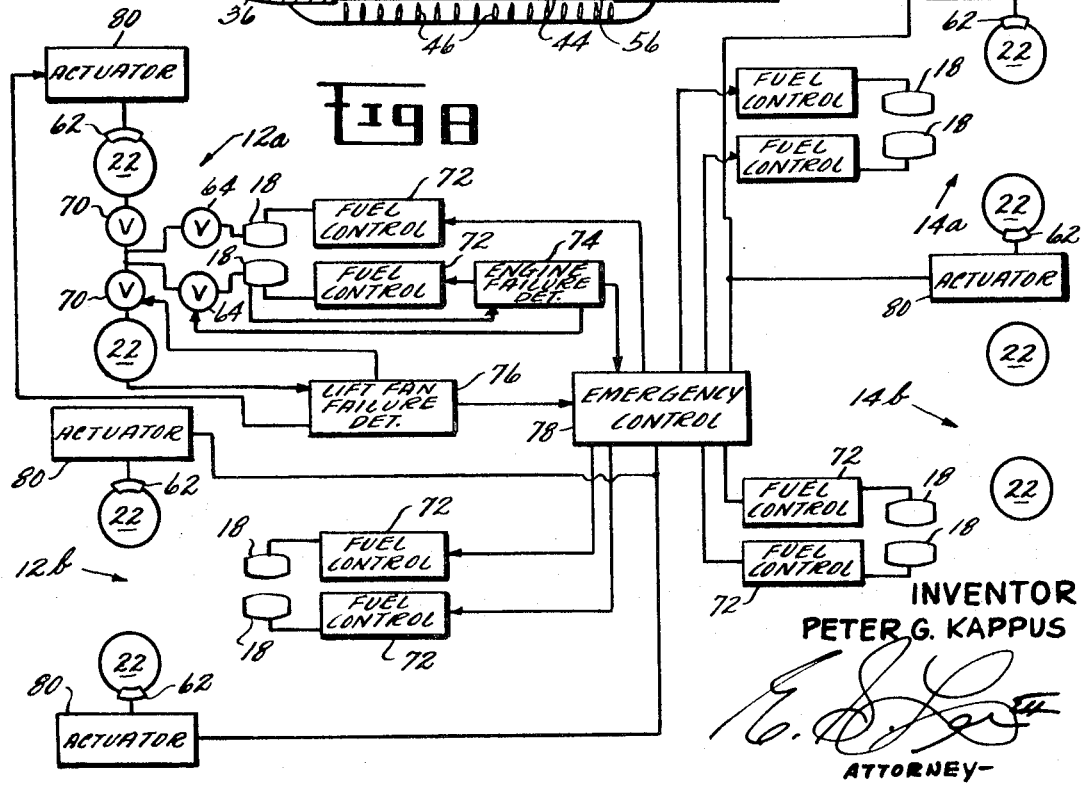

V/STOL AIRCRAFT

The present invention relates to improvements in aircraft and particularly to aircraft capable of taking off and landing either vertically or with a short runway distance, commonly referenced as V/STOL aircraft.

Commercial air transportation has brought impressive benefits to the traveler, permitting him to cross continents and oceans safely in a matter of hours in comfortable aircraft propelled by gas turbine engines of the turbofan and turbojet types. Continuing progress for medium- and long-distance trips is already well advanced with the scheduled introduction into service of jumbo jet aircraft capable of carrying several hundred travelers and supersonic aircraft capable of crossing the ocean in less than 3 hours. Aircraft operators have also benefited in these advances by reason of decreased direct operating costs and increased utilization times.

Shorter distance air travel has noticeably lagged behind the advances of medium- and long-distance travel. There are several reasons for this situation. One is the large proportion of time required for land travel to and from airports which are usually located many miles from an urban center. Another is the long time spent nonproductively by airliners maneuvering to and from large jet ports. Yet another reason and a problem generally applicable to all air transportation is overcrowding of the air space at airports and overburdening of the approach and runway facilities available.

It has long been recognized that these problems could be alleviated, if not fully solved, by aircraft capable of operating from small airports which could be dispersed closer to or within urban centers. To some extent rotating wing aircraft, e.g., helicopters, provide this capability, and today there are many helicopters in operation from heliports of extremely small area, many of which are located on the tops of buildings in a crowded urban center. However, helicopters have limitations as to the distances and speeds at which they are effective from a time of travel, as well as a cost standpoint. The range limit of effectiveness for today's helicopters is 75 miles and the expectable ultimate limit is in the order of 150 miles.

The really significant lack of progress has been in aircraft which are truly effective, from a cost and time standpoint, in operating over travel routes of 200-400 miles with the flexibility to perform adequately over shorter or longer distances. Again, a solution has been identified, namely, fixed (as opposed to rotating) wing V/STOL aircraft, capable of operating from small airports having little or no runway length. Along this line, many proposals have been made to provide temporary, vertical thrust power lift during takeoff and landing with forward flight being more or less conventional as in turbofan- or turbojet-propelled, winged aircraft. Such proposals have included tilt wing aircraft where the propulsion engines are mounted on wings which are vertically disposed to direct the thrust output upwardly during landing and takeoff and pivoted to a horizontal position in forward flight. It has also been proposed to use, in addition to conventional engines, direct lift engines providing a vertical thrust. Further, it has been proposed to provide means for vectoring the thrust output of a gas turbine cruise engine to provide a vertical thrust component. Also, it has been proposed to provide lift fans driven by diverting the hot gas stream of a gas turbine engine from its horizontal propulsive nozzle, during takeoff and landing.

Generally speaking, these and other proposals have been capable of attaining the obvious advantage of operating into and out of airports requiring a very small area and capable of being located in close proximity to urban centers. They also have the further advantage over helicopters in that they can attain reasonably high flight speeds and altitudes for route distances in the 200-400 mile range. Such fixed-wing V/STOL aircraft provide the potential solution to air transportation problems of congestion, both in conventional airports and in land transportation to and from such conventional airports. Downtown airports may be scattered so that there is not a concentration of land traffic in any one given access area. Similarly, air congestion at conventional airports may be decreased since several different areas of a large airport could be set aside for simultaneous landing and takeoff for V/STOL aircraft in the area of a conventional runway. The much slower approach speeds could permit many more aircraft to safely occupy the air space for multiple takeoffs and landings.

However, previously proposed fixed-wing, V/STOL aircraft have encountered many problems in assuring safe and reliable operation. From a practical standpoint prior fixed-wing V/STOL aircraft have also had such high direct operating costs that they are commercially unattractive. Considering the latter, it must be recognized that all factors affecting aircraft operation must be considered in establishing a profitable tariff schedule. These factors include, for example, initial investment cost, fuel cost, and maintenance cost, as well as the utilization time, turn-around time and payload capacity.

Accordingly, one object of the present invention is to provide a safe, reliable V/STOL aircraft having a minimum, direct operating cost.

As was indicated above, one prior proposal for providing vertical thrust augmentation in V/STOL aircraft is the use of lift fans. Such fans are mounted within the fixed-wing structure of an aircraft and powered by the hot gas stream of the aircraft engine to generate a downwardly directed airstream. Once the aircraft transitioned into forward flight, the hot gas stream from the aircraft engines would be shut off from the lift fans and the engines used solely for forward propulsion.

In order to obtain sufficient vertical thrust, prior fan-in-wing, lift fan aircraft have necessitated the use of aircraft wings having relatively large areas. Other designs proposing fuselage-mounted lift fans and gas generators lead to very complex retractable lift fan installations. For these reasons, the full potential of the lift fan concept has not been fully realized in V/STOL aircraft designs proposed so far.

Accordingly, another and ancillary object of the invention is to minimize wing area, wing weight, and general complexity while providing engine out or lift fan out safety without interconnecting hot gas ducts and further to minimize wing chord and enable an increase in the aspect ratio of V/STOL aircraft wings carrying lift fans.

These ends are attained by an aircraft having a fuselage and two wings which are horizontally and preferably vertically offset relative to each other. A propulsion unit is mounted on each wing. Each propulsion unit comprises two gas turbine engines and two lift fans. Valve means are provided for diverting the hot gas streams generated by the gas turbine engines to power the lift fans and thereby generate a vertical thrust component. In forward flight, the valve means direct the gas streams of the engines through propulsion nozzles. Preferably, upon reaching a cruise altitude, one engine of each propulsion unit may be reduced in power, as by being shut down, to minimize fuel consumption.

Preferably each lift fan and engine have reserve capacity so that in the event of a failure of the lift fan or engine of one propulsion unit, the reserve capacity of the other fan can be brought into play and the diagonally offset propulsion unit may be reduced in power to maintain balance in the lift mode. Simultaneously the remaining engines are increased to their emergency ratings to maintain controlled aircraft operation.

Another preferred feature of the invention is in forming the pressure chambers for directing the hot gas stream to each lift fan, as integral elements of the wing halves in which the lift fans are mounted.

The above and other related objects and features of the invention will be apparent from a reading of the following description of the disclosure found in the accompanying drawings and the novelty thereof pointed out in the appended claims.

In the drawings:

FIG. 6 is a section taken on line VI—VI in FIG. 3;

FIG. 7 is a section taken on line VII—VII in FIG. 6; and

FIG. 8 is a diagrammatic sketch of a control system for this aircraft.

Figure 1:
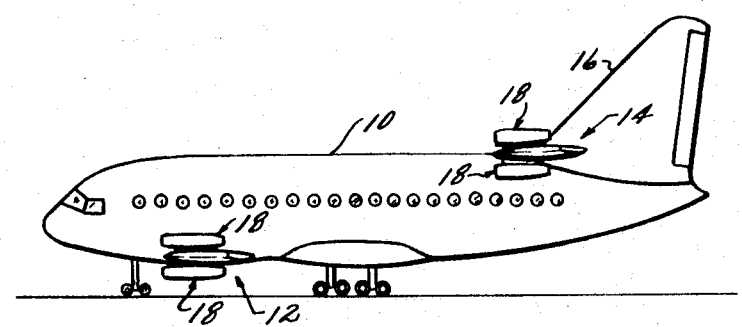
FIG. 1 is an elevation of a V/STOL aircraft embodying the present invention.
Figure 2:
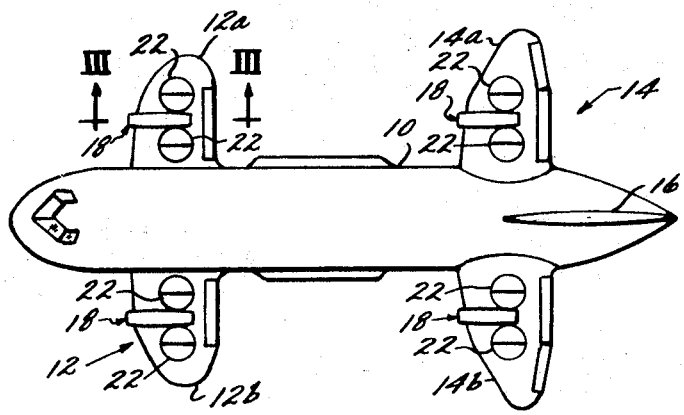
FIG. 2 is a plan view of the aircraft.

The aircraft seen in the drawings comprises a fuselage 10, a forward wing 12 having oppositely projecting halves 12a and 12b and a rear wing 14 having oppositely directed halves 14a and 14b and a vertical tail 16. The fuselage 10 may be constructed in a conventional fashion having provision for landing gear and access to the interior.

The wings 12 and 14 both provide lift when the aircraft has sufficient forward speed. Further, control surfaces, or flaps, may be provided on the wings as well as on the tail 16 to provide directional control functions primarily during the cruise mode of the aircraft, as will be later apparent. The rear wing 14 may be further provided with additional control flaps to perform the functions normally associated with the stabilizer of more conventional aircraft.

Each wing half is provided with a propulsion unit which preferably and advantageously may be identical in all wing halves. This propulsion unit comprises two gas turbine engines 18 mounted respectively above and below a wing half. It also comprises lift fans 22 mounted within the wing half on opposite sides of the gas generators when viewed in plan. Each of the engines 18 and each of the turbofans 22 may likewise be identical in construction.

The gas turbine engines may be of well-known design, generally comprising a compressor 26 which pressurizes air for supporting combustion of fuel in a combustor 28. The hot gas stream thus generated powers a turbine 30 which, in turn, drives the compressor rotor. The hot gas stream after discharging from the turbine 30 may either be directed through a propulsion nozzle 32 for forward flight or directed to the lift fans 22 to provide vertical thrust. Alternatively, low-bypass turbofan-type gas generators may also be used.

The discharge casing of each gas turbine engine, upstream of the propulsive nozzle 32, is provided with a port 34 opening into plenum chambers 36 within the wing half.

The plenum chambers 36 have flow-defining surfaces in the form of scrolls 37 for directing the hot gas streams through nozzle vanes 38 to tip turbines 40 attached peripherally to the outer ends of the fan blades 42 of the lift fans 22. When the lift fans are so driven, the fan blades 42 pressurize airstreams which are discharged through outlet guide vanes 44 to provide vertical thrust. Louvers 46 are provided at each fan discharge to cover the wing opening for the fan discharge when the lift fan is not in use. Similarly, cover plates 48, hinged at the entrance opening in the upper surface of the wing, may be swung to the horizontal positions to cover over the opening when the lift fan is not in operation.

The gas pressure in the plenum chambers 36 is contained by portions of longitudinally extending spars 50 and ribs 52. The two chambers 36 are separated by central members 53 which are spaced apart at the openings 34. The structure containing gas pressure in the chambers 36 is further defined by sheet metal portions 54, which form the upper surface of the wing and lift fan inlet, and other sheet metal portions 56, which form the lower surface of the wing and generally define the fan discharge opening. The sheet metal portions 54 and 56, as illustrated in FIG. 7, define the flow channel for the lift fan airflow entering on the wing top surface and the hot gas exhaust on the lower wing surface. They also serve to structurally reinforce the cutout in the wing surfaces. Turbine nozzle vanes 38 are mounted in the outlet openings to properly direct the hot gas streams to the tip turbines. The flow channel surfaces of the scrolls 37 are preferably formed by thin sheet material properly vented to the described wing structure which contains the pressurized plenum chambers. Insulating material 60 protects these structural members of the wing from overheating.

The described construction of the pressure chamber as an integral part of the wing structure effectively reduces the required spacing between the spars 50 and thus enables the wings to have smaller chords and higher aspect ratios. The desired shortness of chord is also attained by using two lift fans in side-by-side relationship in each wing half.

Each turbofan may be provided with flap valves 62 in the terminal portions of the circumferential discharge opening to control gas flow to the turbine. Such valves may be formed and actuated in accordance with the teachings of U.S. Pat. No. 3,249,333, which is in common assignment with the present U.S. application.

Valves 64, 66 are provided in the discharge casing of each gas turbine engine for selectively directing the hot gas stream either to power the lift fans or for discharge through the propulsion nozzles 32. These valves, with the exception that they are separately actuated, are in accordance with the teachings of U.S. Pat. No. 3,270,775 which is also of common assignment with the present U.S. application.

Figure 3:
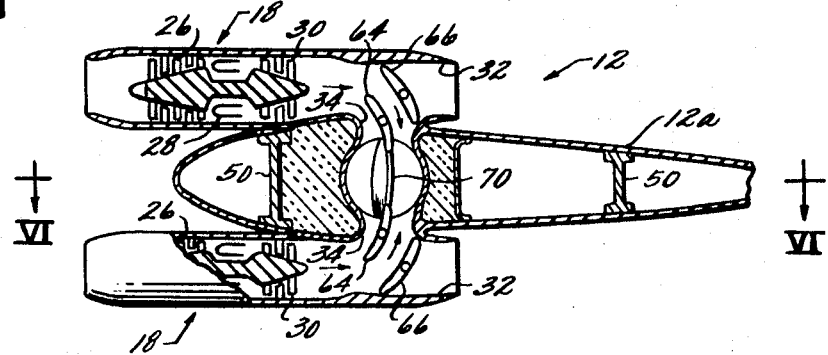
FIG. 3 is a section, on an enlarged scale, taken on line III—III in FIG. 2.

In vertical takeoff or landing, both gas turbine engines of each propulsion unit are operating and the valves 64 and 66 are in the positions shown in FIG. 3. At this point in time, the cover flaps 48 are in their open position and the louvers 46 are also in their open positions, as shown in FIG. 7. The lift fans provide vertical thrust sufficient to control the operation of the aircraft, both during ascent and descent. Power generator or louver controls would be employed to balance the lift of the propulsion units so that the attitude of the aircraft would be properly maintained.

Figure 4:
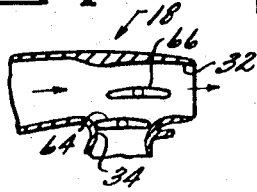
FIGS. 4 and 5 are fragmentary sections illustrating alternate positions of valve means seen in FIG. 3.

In takeoff, after a desired height has been reached, means are provided for pivoting the louvers 46 toward the rear to provide a forward thrust component for translation into forward flight. When sufficient forward speed has been obtained for the wings 12 and 14 to provide the required lift, the valves 64 and 66 are pivoted to the positions illustrated in FIG. 4 to shut down the lift fans. At this time the louvers 46 would be fully closed and the cover plates 48 also closed to provide an aerodynamically clean surface for the wing.

Figure 5:
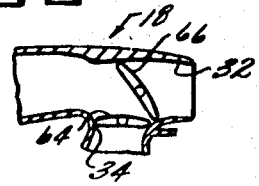

Vertical takeoff may be required for a matter of several hundred feet. After reaching such a height and translation has been made to forward flight, as described above, all engines remain in operation in order that a cruise altitude of several thousand feet may be quickly reached. After reaching cruise altitude, one engine of each power unit maybe shut down in order to minimize fuel consumption. The number of engines shut down depends on gas generator cycle characteristics and can vary with load and flight conditions. In any event airflow through the shutdown engines is shut off by closing valve 66, as illustrated in FIG. 5. This minimizes drag of the inoperative engines in the cruise mode. Such drag may be further minimized by special aerodynamically contoured engine inlet closures.

After finishing the cruise portion of a flight, the aircraft descends to the altitude desired for the vertical descent portion of the flight mission. At this time the engines, which have been shut down, are restarted, the cover plates 48 are opened, and the louvers 46 are partially opened. The valves 64 and 66 are returned to the positions of FIG. 3 to power the lift fans, and a translation is made from forward flight to a hover position in which the aircraft is sustained by the lift fan thrust. The engines 18 are throttled back to provide controlled descent of the aircraft and a gentle touchdown on the landing area.

The described aircraft configuration and propulsion units utilize the known advantages of lift fans for vertical translation. The aircraft gains in overall efficiency by having minimum wing area as well as relatively no additional drag due to inoperative lift fans. This advantage is gained through the method of mounting the lift fans in the wing structures, as well as by the utilization of side-by-side mounted lift fans, in a fashion eliminating the necessity of laterally extending ducts in the wing which would further increase their area. The provision of eight engines enables rapid, economical, vertical translations and fast climbing speeds to a cruising altitude, at which point a lesser number of engines economically provide cruise thrust. What might appear to be an excessive number of engines and lift fan units provides complete safety through redundancy of each component with no need for prime reliability of dynamically stressed components which would be almost impossible to achieve. Overall costs are minimized by all engines and all fans being, respectively, essentially identical. Not only is unit price reduced, but the control system for the propulsion units is simplified. Maintenance costs are also reduced since essentially there is only one type of engine and one type of lift fan requiring maintenance.

The redundancy of engines and lift fans in each power unit also provides the necessary degree of reliability in the event of an engine or lift fan failure. In this connection it will be noted that each engine and each lift fan has an emergency power capability. For purposes of illustration, emergency power output is obtained from the engines by increasing fuel flow. In the case of the lift fans, emergency power is obtained by opening the flapper valves 62 to increase the mass flow of hot gas stream to the tip turbine which powers the lift fan. If, for example, during vertical flight, an engine failed in wing 12a, the output of the unaffected engine would be increased to its emergency rating. The engines in wing 14b would automatically be throttled back so that the total vertical thrust in the wing halves 12a and 14b would be matched to maintain stable aircraft operation. Simultaneously the engines of the power units for the wing halves 12b and 14a would be increased to their emergency ratings and the flapper valves 62 for the lift fans of those propulsion units would be opened to provide increased vertical thrust which, at least partially, would compensate for the thrust reductions in the other propulsion units.

The other type of failure of prime significance would be loss of a lift fan. If this were to occur in the propulsion unit of wing 12a, the remaining lift fan of that propulsion unit would be increased to its emergency power rating. At the time, a valve 70 would be closed to shut off flow of hot gas to the inoperative lift fan. The engines of the propulsion unit in wing half 14b would be throttled back to maintain stable flight and the engines and lift fans of the remaining propulsion units would be increased to their emergency ratings to provide sufficient vertical thrust.

It will also be recognized that if an engine or lift fan failure is detected in cruise, the pilot has the additional option of diverting to an airport having sufficient runway length for a conventional landing.

FIG. 8 illustrates a system capable of performing the functions described above. For purposes of simplification, it is assumed that all failures will occur in selected engines and lift fans of the propulsion unit of wing half 12a and only the components required to respond to such failures are shown. Corresponding hardware for responding to failures in other propulsion units will be readily apparent to those skilled in the art.

Each of the engines 18 is provided with a fuel control 72 which is normally responsive to power settings of a pilot-controlled throttle lever. Further mechanism is provided for controlling normal operation of the valves 64 and 66 to provide for the operating functions previously described in selectively utilizing the hot gas streams of the engines 18 for forward or vertical propulsion. Such normal operating mechanism and means for balancing the thrust outputs of the various propulsion units to obtain the normal modes of operation may take many forms and are not herein described in detail.

FIG. 8, as indicated, illustrated controls used in emergency modes of operation. Each engine and each lift fan is provided with an engine failure detector 74 and a lift fan failure detector 76. (Only the failure detectors for the inboard lift fan 22 and engine 18 of the wing half 12a are shown, since failures of these engines are going to be described for illustrative purposes.)

Assuming that the lower engine 18 for the propulsion unit of wing half 12a detects a failure, the failure detector generates, using known logic techniques, three output signals. The first output signal closes the associated valve 64. The second output to the fuel control 72 shuts down fuel flow to that engine and the third output is an input to an emergency control 78. The emergency control, in response to the signal input from the engine failure detector, generates several output signals, again using known logic means. One output signal is to the fuel control for the operative engine of the propulsion unit for wing half 12a, advancing that engine to its emergency rating. Other outputs are to the fuel controls 72 for the engines 18 of the propulsion unit of wing half 14b. These outputs reduce fuel flow to balance the thrust of the lift fans 22 of that propulsion unit with the reduced thrust obtainable from the propulsion unit 12a operating with one engine out.

Other output signals from egency emergency control 78 go to the fuel controls for the engines 18 of the propulsion units for wing halves 12b and 14a. These outputs increase fuel flow to increase these engines' outputs to their emergency ratings. Finally the emergency control, in response to a signal input from the engine failure detector 74, generates output signals to actuators 80 which open the valves 62 associated with the lift fans 22 of the propulsion units in wing halves of 12b and 14a increasing these lift fans to their emergency rating, thereby, in combination with the increased energy output of the engines in these wing halves, providing a compensating thrust increase to, at least substantially, make up for the thrust decrease in the propulsion units for other wing halves.

In the event the lift fan failure detector 76 detects a failure in the inboard lift fan 22 of the propulsion unit for wing half 12a, three output signals are generated. The first output signal closes the valve 70 associated with the failed lift fan. The second signal goes to the actuator 80 controlling the valves 62 of the operative lift fan of the propulsion unit for wing half 12a, opening these valves and increasing that lift fan to its emergency rating. The third output signal of the lift fan failure detector 76 is an input signal to the emergency control 78. The emergency control 78 responds to a lift fan failure detector input in the same fashion as an input from the engine failure detector, with the exception that there is no input to the fuel controls for the engines 18 of the propulsion unit of wing half 12a and with the exception that the magnitude of the output signals from the emergency control to the propulsion units of the remaining wing halves may be modified to account for any differential between the loss of thrust from a engine failure and the loss of thrust from a lift fan failure.

While the present description has emphasized vertical takeoff and landing modes of operation, it is recognized that it may not be economically feasible to provide sufficient vertical thrust for such modes of operation at extreme conditions of airport altitude, hot day condition and maximum payload. Under such an extreme condition or combination of conditions the described aircraft is capable of landing or takeoff using a much shorter runway length than conventional aircraft. In such short takeoff or landing mode, selected engines would be used to provide forward propulsion and selected lift fans would be used to provide vertical propulsion as well as forward propulsion thrust components derived from a selected positioning of the louvers 46. In this fashion, both the lift fans and the lift of the wings control takeoff and descent in a short distance of forward travel. Various modifications of the disclosed embodiment of the invention will occur to those skilled in the art, particularly in mechanization of the inventive concepts involved. The scope of the invention is therefore to be derived solely from the appended claims.

Having thus described the invention, what is claimed as novel and desired to be secured by Letters Patent of the United States is:

1. A V/STOL aircraft comprising a fuselage, tandem wings spaced apart lengthwise of the fuselage, each wing half of the tandem wings having essentially continuous airfoil surfaces,
   a propulsion unit for each wing half,
   each propulsion unit comprising,
   a pair of gas turbine engines, horizontally mounted on the wing half and respectively having propulsion nozzles through which the hot gas streams of the engines may be discharged, one of said engines and its nozzle being mounted above the wing half and the other of said engines and its nozzle being mounted below the wing half, a pair of lift fans mounted generally within the outline of the wing half with one lift fan inboard of the engines and the other lift fan outboard of the engines, and means for selectively directing the engines' hot gas streams to power the lift when a vertical thrust component is desired and through both the respective propulsion nozzles where a forward thrust component is desired.

2. A V/STOL aircraft as in claim 1 wherein, the wings are vertically spaced.

3. A V/STOL aircraft as in claim 2 wherein, the engines of all propulsion units are essentially identical and the lift fans of all propulsion units are essentially identical.

4. A V/STOL aircraft as in claim 3 wherein, the lift fans have tip turbines driven by the hot gas streams of the engines to power the lift fans and each wing half has aligned openings in its upper and lower surfaces for inlet of air to the lift fans and discharge of propulsion streams, each of said wing halves has pressure plenum chambers defined by structural elements of the wing half, each chamber having a downwardly open outlet peripherally of the upper opening, for discharging the hot gas stream to the tip turbine, each chamber including a nonstructural aerodynamic surface in scroll form for directing the hot gas stream to the tip turbine.

5. A V/STOL aircraft as in claim 1 wherein, the engines of all the propulsion units are essentially identical and the lift fans of all propulsion units are essentially identical and further including, means for shutting down selected engines to conserve fuel in the cruise mode.

6. A V/STOL aircraft as in claim 5, further comprising, means for shutting off air flow through the inoperative engines.

7. A V/STOL aircraft as in claim 1 wherein, the engines of all the propulsion units are essentially identical and have emergency power ratings and the lift fans of all propulsion units are essentially identical and have emergency power ratings and further including, means responsive to a failure of any one engine for increasing the power of the other engine of that propulsion unit to its emergency rating and reducing the power setting of the engines in the diagonally opposite wing half and increasing the engines and lift fans of the remaining propulsion units to their emergency ratings.

8. A V/STOL aircraft as in claim 1 wherein, the engines of all the propulsion units are essentially identical and have emergency ratings and the lift fans of all the propulsion units are essentially identical and have emergency power ratings and further including, means responsive to a failure of any one lift fan for increasing the output of the other lift fan of that propulsion unit to its emergency power rating, reducing the power output of the lift fans of the diagonally opposite unit and increasing the engines and lift fans of the remaining propulsion units to their emergency ratings.

9. A V/STOL aircraft as in claim 1 wherein, the lift fans are disposed in side-by-side relationship and the lift fans have tip turbines driven by the hot gas streams of the engines to power the lift fans and each wing half has aligned openings in its upper and lower surfaces for inlet of air to the lift fans and discharge of propulsion streams, each of said wing halves has pressure plenum chambers defined by structural elements of the wing half, each chamber having a downwardly open outlet peripherally of the upper opening, for discharging the hot gas stream to the tip turbine, each chamber including a nonstructural aerodynamic surface in scroll form for directing the hot gas stream to the tip turbine.

10. A V/STOL aircraft comprising, a gas generator, a wing having aligned openings in its upper and lower surfaces and structural elements defining a pressure chamber at least partially surrounding said openings and having a downwardly open outlet peripherally of the upper opening, means for connecting the chamber to the gas generator discharge, a lift fan having a fan inlet registered with the upper opening and a tip turbine registered with said pressure chamber outlet, said fan and tip turbine being registered with said discharge opening, whereby the chord of said wing may be minimized.

11. A V/STOL aircraft as in claim 10 wherein, said chamber includes a nonstructural aerodynamic surface in scroll form for directing the hot gas stream to the tip turbine.

12. A V/STOL aircraft as in claim 10 wherein, the wing has second aligned openings in its upper and lower surfaces disposed in side-by-side relationship lengthwise of the wing with the first openings and the structural elements define a pressure chamber also at least partially surrounding said openings and having a downwardly open outlet peripherally of the second upper opening and a second lift fan having a fan registered with the second upper inlet opening and a tip turbine registered with said second pressure chamber outlet, said second fan and tip turbine being registered with said second discharge opening, 13. A V/STOL aircraft as in claim 12 wherein, the wing includes lengthwise extending spars, portions of which define said pressure chamber and between which the engines are mounted, said wing further including ribs on opposite sides of the two lift fans, said ribs further defining portions of the pressure chambers.

14. A V/STOL aircraft as in claim 13 wherein, the gas generator is mounted on the wing between the two lift fans, thereby eliminating the need for duct connections beyond the bounds of the pressure chambers.

* * * * *

UNITED STATES PATENT OFFICE
CERTIFICATE OF CORRECTION

Patent No. 3,618,875   Dated November 9, 1971

Inventor(s) Peter G. Kappus

It is certified that error appears in the above-identified patent and that said Letters Patent are hereby corrected as shown below:

Column 7, line 9, after "lift", should read -- fans --.

Signed and sealed this 24th day of October 1972.

(SEAL)
Attest:

EDWARD M. FLETCHER, JR.
Attesting Officer

ROBERT GOTTSCHALK
Commissioner of Patents